United States Patent
Sridhar et al.

(10) Patent No.: US 7,364,810 B2
(45) Date of Patent: Apr. 29, 2008

(54) COMBINED ENERGY STORAGE AND FUEL GENERATION WITH REVERSIBLE FUEL CELLS

(75) Inventors: K. R. Sridhar, Los Gatos, CA (US); Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 656 days.

(21) Appl. No.: 10/653,240

(22) Filed: Sep. 3, 2003

(65) Prior Publication Data
US 2005/0048334 A1    Mar. 3, 2005

(51) Int. Cl.
*H01M 8/18*  (2006.01)
*H01M 8/10*  (2006.01)

(52) U.S. Cl. ............... 429/17; 429/19; 429/21
(58) Field of Classification Search ............ None
See application file for complete search history.

(56) References Cited

U.S. PATENT DOCUMENTS

| | | |
|---|---|---|
| 4,041,210 A | 8/1977 | Van Dine |
| 4,792,502 A | 12/1988 | Trocciola et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,527,631 A | 6/1996 | Singh et al. |
| 5,573,867 A | 11/1996 | Zafred et al. |

(Continued)

FOREIGN PATENT DOCUMENTS

WO    WO 03/094320 A2    11/2003

(Continued)

OTHER PUBLICATIONS

Cell and Stack Construction: Low-Temperature Cells, L.G. Austin, NASA SP-120, 1967, no month.

(Continued)

*Primary Examiner*—John S. Maples
(74) *Attorney, Agent, or Firm*—Foley & Lardner LLP

(57) ABSTRACT

An electrochemical system includes a reversible fuel cell system which generates electrical energy and reactant product from fuel and oxidizer in a fuel cell mode and which generates the fuel and oxidant from the reactant product and the electrical energy in an electrolysis mode. The system also includes a reactant product delivery device which is adapted to supply the reactant product to the reversible fuel cell system operating in the electrolysis mode, in addition to or instead of the reactant product generated by the reversible fuel cell system in the fuel cell mode, and a fuel removal device which is adapted to remove the fuel generated by the reversible fuel cell system operating in the electrolysis mode from the electrochemical system.

51 Claims, 8 Drawing Sheets

U.S. PATENT DOCUMENTS

| | | | |
|---|---|---|---|
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,900,330 | A | 5/1999 | Kagatani |
| 5,955,039 | A | 9/1999 | Dowdy |
| 6,013,385 | A | 1/2000 | DuBose |
| 6,033,794 | A | 3/2000 | George et al. |
| 6,051,125 | A | 4/2000 | Pham et al. |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | DuBose |
| 6,451,466 | B1 | 9/2002 | Grasso et al. |
| 6,531,243 | B2 | 3/2003 | Thom |
| 6,569,298 | B2 | 5/2003 | Merida-Donis |
| 6,623,880 | B1 | 9/2003 | Geisbrecht et al. |
| 6,821,663 | B2 | 11/2004 | McElroy et al. |
| 7,014,932 | B2 * | 3/2006 | Halter et al. ............... 429/22 |
| 7,201,979 | B2 * | 4/2007 | McElroy et al. ............. 429/13 |
| 2001/0049035 | A1 | 12/2001 | Haltiner, Jr. et al. |
| 2002/0028362 | A1 | 3/2002 | Prediger et al. |
| 2002/0051898 | A1 | 5/2002 | Moulthrop, Jr. et al. |
| 2002/0058175 | A1 | 5/2002 | Ruhl |
| 2002/0090866 | A1 | 7/2002 | Schmitman |
| 2002/0106544 | A1 | 8/2002 | Noetzel et al. |
| 2003/0157386 | A1 | 8/2003 | Gottmann et al. |
| 2003/0162067 | A1 | 8/2003 | McElroy et al. |
| 2003/0167105 | A1 | 9/2003 | Colburn |
| 2003/0196893 | A1 | 10/2003 | McElroy et al. |
| 2003/0205641 | A1 | 11/2003 | McElroy et al. |
| 2004/0013923 | A1 * | 1/2004 | Molter et al. ............... 429/25 |
| 2004/0081859 | A1 | 4/2004 | McElroy et al. |
| 2004/0137300 | A1 | 7/2004 | Gemmen et al. |
| 2004/0191597 | A1 | 9/2004 | McElroy |
| 2004/0224193 | A1 | 11/2004 | Mitlitsky et al. |

FOREIGN PATENT DOCUMENTS

| | | |
|---|---|---|
| WO | WO 2004/093214 | 10/2004 |

OTHER PUBLICATIONS

Low Cost, High Efficiency Reversible Fuel Cell Systems, Proceedings of the 2002 U.S. DOE Hydrogen Program Review, NREL/CP-610-32405, no month.

Low Cost Reversible Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program, no date.

Small, Ultra Efficient Fuel Cell Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP-570-30535, no month.

Regenerative Fuel Cells for High Altitude Long Endurance Solar Powered Aircraft, F. Mitlitsky, et al, 28th Intersociety Energy Conversion Engineering Conference (IECEC), Jul. 28, 1993, UCRL-JC-113485.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130, (Sep.).

"High Temperature Electrolysis of Steam and Carbon Dioxide", Soren Hojgaard Jensen et al., from Proceedings of Riso International Energy Conference, held at Riso National Laboratory, Denmark, May 19-21, 2003, Riso-R-1405(CN), pp. 204-215, L.S. Petersen and H. Jensen, eds.

U.S. Appl. No. 10/446,704, filed May 29, 2003.

Ledjeff, K. et al., "Regenerative Fuel Cell for Energy Storage in PV Systems", Proceedings of the 26th Intersociety Energy Conversion Engineering Conference, vol. 3, Conf 26, Aug. 1991, pp. 538-541.

* cited by examiner

COMBINED ENERGY STORAGE AND FUEL GENERATION WITH REVERSIBLE FUEL CELLS

BACKGROUND OF THE INVENTION

The present invention is generally directed to fuel cells and more specifically to reversible fuel cells and their operation.

Fuel cells are electrochemical devices which can convert energy stored in fuels to electrical energy with high efficiencies. There are classes of fuel cells that also allow reversed operation, such that oxidized fuel can be reduced back to unoxidized fuel using electrical energy as an input. The ability to generate electricity and regenerate fuel makes these fuel cells suitable for electrical energy storage.

BRIEF SUMMARY OF THE INVENTION

One preferred aspect of the present invention provides an electrochemical system which includes a reversible fuel cell system which generates electrical energy and reactant product from fuel and oxidizer in a fuel cell mode and which generates the fuel and oxidant from the reactant product and the electrical energy in an electrolysis mode. The system also includes a reactant product delivery device which is adapted to supply the reactant product to the reversible fuel cell system operating in the electrolysis mode, in addition to or instead of the reactant product generated by the reversible fuel cell system in the fuel cell mode, and a fuel removal device which is adapted to remove the fuel generated by the reversible fuel cell system operating in the electrolysis mode from the electrochemical system.

Another preferred aspect of the present invention provides an electrochemical system, comprising a first means for cyclically operating in a fuel cell mode to generate electrical energy and reactant product from fuel and oxidizer and in an electrolysis mode to generate the fuel and oxidant from the reactant product and the electrical energy. The system also comprises a second means for providing excess reactant product to the first means operating in the electrolysis mode from outside the electrochemical system, in addition to or instead of the reactant product generated by the first means in the fuel cell mode, such that fuel in excess of fuel required to operate the first means in the fuel cell mode is generated in the electrolysis mode over a predetermined number of operating cycles, and a third means for removing the excess fuel generated by the first means operating in the electrolysis mode from the electrochemical system.

Another preferred aspect of the present invention provides a method of operating an electrochemical system containing a reversible fuel cell system, comprising cyclically operating the reversible fuel cell system in a fuel cell mode to generate electrical energy and reactant product from fuel and oxidizer and in an electrolysis mode to generate the fuel and oxidant from the reactant product and the electrical energy. The method also comprises providing excess reactant product to the reversible fuel cell system operating in the electrolysis mode from outside the reversible fuel cell system, in addition to or instead of the reactant product generated by the reversible fuel cell system in the fuel cell mode, such that fuel in excess of fuel required to operate the reversible fuel cell system in the fuel cell mode is generated in the electrolysis mode over a predetermined number of operating cycles, and removing the excess fuel generated by the reversible fuel cell system operating in the electrolysis mode from the electrochemical system.

DETAILED DESCRIPTION OF THE PREFERRED EMBODIMENT

The present inventors have realized that regenerative or reversible operation of fuel cells can be applied beyond mere energy storage to produce fuel for uses outside the fuel cell system. A reversible fuel cell is used to reversibly store electrical energy. When electrical energy is needed from the storage system, the fuel cell operates in a fuel cell or discharge mode. In this mode, fuel is oxidized in the fuel cell, electricity is generated, and part or all of the reactant product is stored, if desired. The system is then recharged in an electrolysis or charge mode. In this mode, the system is recharged by supplying electrical power to the fuel cell, electrolyzing the stored and/or supplied reactant product, thereby regenerating the fuel. The regenerated fuel and optionally the regenerated oxidant are stored and available for energy generation in the fuel cell mode. The system cyclically or alternatively switches operation between the fuel cell and electrolysis modes for any suitable number of cycles. If more electrical energy and reactant product than needed to regenerate the fuel is supplied to the reversible fuel cell over a predetermined number of operating cycles, then excess or additional fuel can be generated during the electrolysis mode during some or all of these cycles. In other words, more fuel is generated when the system operates in the electrolysis mode than the fuel needed to operate the system in the fuel cell mode. This excess fuel can be used outside the energy storage system.

Figure 1:
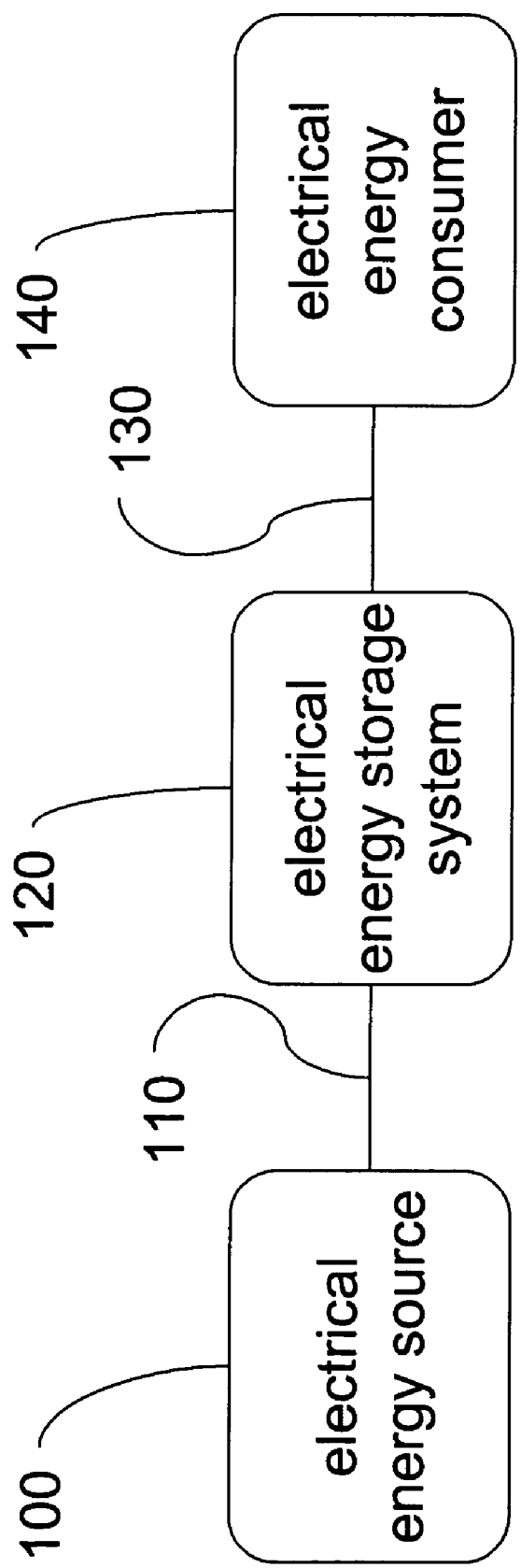
FIG. 1 is a schematic of an electrical energy storage system.

FIG. 1 shows an energy source 100 connected via a conduit 110 to an energy storage system 120. The energy storage system 120 is connected via conduit 130 to the energy consumer 140. The energy storage system 120 supplies the required power to the energy consumer 140 at all times or at predetermined times, if desired. The energy supplied to the consumer comes from the energy source 100, or from the energy storage system 120, or a combination of the two. The system shown in FIG. 1 decouples the amount of power drawn by the energy consumer 140 from the amount of energy drawn from the energy source 100.

Examples of the energy source 100 include, but are not limited to the electrical grid, electrical generators and renewable energy sources. Preferred renewable energy sources include photovoltaic sources, such as solar cell arrays, wind power sources, such as wind turbines, tidal power sources in which power is generated from forces of ocean, sea or lake tides, and geothermal power sources in which power is generated from geothermal heat.

The energy storage system 120 is preferably a reversible or regenerative fuel cell system, as will be described in more detail below with respect to FIG. 2. Examples of the energy consumer 140 include, but are not limited to residential households, commercial building, such as factories, hospitals and office building, electrical subgrids, and remote transmitters.

The system 120 will draw more power from the energy source 100 than what is supplied to the energy consumer 140 in the electrolysis mode and the additional power is stored in the form of regenerated fuel. In the fuel cell mode the system 120 provides electrical power or energy to the consumer 140 instead of or in addition to the power provided to the consumer 140 from the energy source 100. As used herein, the terms "electrical power" and "electrical energy" refer to features of electricity provided by the energy source 100 and to features of electricity provided to the consumer 140.

Figure 2:
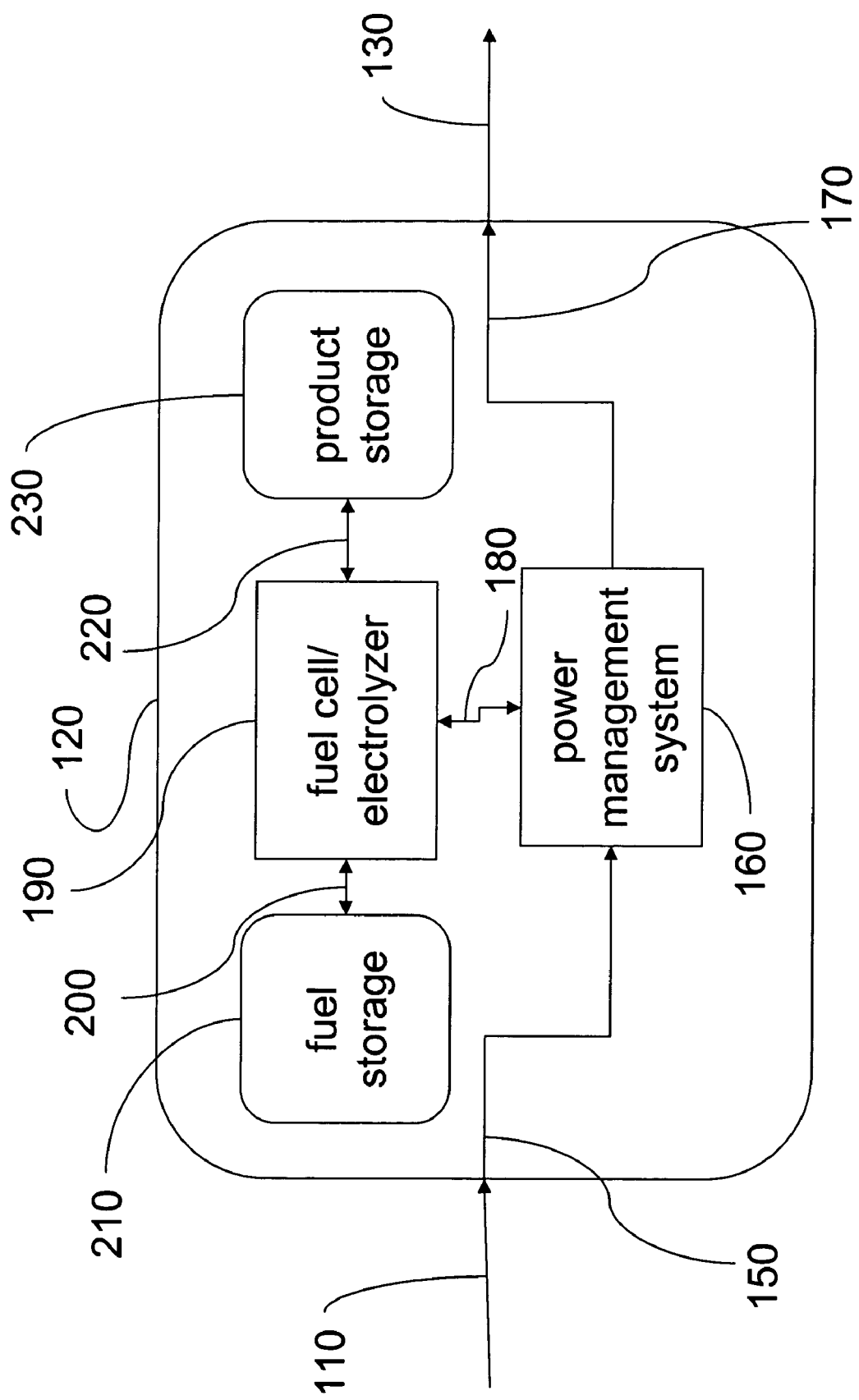
FIG. 2 is a schematic of an electrical energy storage system with a reversible fuel cell system.

FIG. 2 shows details of the energy storage system 120. The system 120 is preferably an electrochemical system which contains a power management system 160, a reversible fuel cell system 190, a fuel storage device 210 and an optional reactant product storage device 230. The system also contains electrical connection conduits or wires 150, 170 and 180, as well as a fuel conduit 200 and a reactant product conduit 220 which allow the fuel and reactant product to pass between the reversible fuel cell system 190 and the fuel storage 210 and product storage 230 devices, respectively.

The power management system 160 may be any suitable controller device, such as a computer or microprocessor, and preferably contains logic circuitry which decide how to route the power streams. Energy from the electrical energy source 100 can be directed fully to the electrical energy consumer 140, fully to the reversible fuel cell system 190, or can be partitioned between the electrical energy consumer 140 and the reversible fuel cell system 190. It is also possible to feed electrical energy back towards the electrical energy source 100, which can be applied for example where the electrical energy source 100 is the electrical grid. The power management system 160 also controls from where power is supplied to the electrical energy consumer 140. Power can be supplied from the electrical energy source 100, the reversible fuel cell system 190, or a combination thereof.

The reversible fuel cell system 190 may comprise one or more reversible fuel cells or one or more fuel cell/electrolyzer pairs. A reversible fuel cell is a single electrochemical device which generates reactant product and electrical energy or power in the fuel cell mode and which generates fuel from reactant product and electrical energy in the electrolysis mode. A fuel cell/electrolyzer pair includes two separate devices, where a non-reversible fuel cell device generates energy, and the other electrolyzer device regenerates fuel.

Examples of the fuel cells and electrolyzers include but are not limited to high temperature fuel cells, such as solid oxide fuel cells (SOFC), and also include proton exchange membrane fuel cells (PEM). Reversible or regenerative SOFC's (SORFCs) are well suited to combine energy generation and fuel regeneration in a single device. However, other fuel cells, such as molten carbonate fuel cells, may also be used in the system 190. Preferably, the system 190 contains at least one stack of reversible fuel cells or stacks of fuel cell/electrolyzer pairs.

The fuel and reactant product storage devices 210 and 230 may comprise any suitable gas, liquid or solid storage devices. Preferably, these devices 210, 230 comprise gas or liquid tanks which are opened and closed with a valve.

The system 120 operates as follows. Power from the electrical energy source 100 enters through conduit 110 and conduit 150 to the power management system 160. When the reversible fuel cell system 190 operates in the fuel cell mode and provides electrical energy, fuel is fed from the fuel storage device 210 to the reversible fuel cell system 190 via the fuel conduit 200. In the reversible fuel cell system 190, the chemical energy of the fuel is converted to electrical energy, which is then supplied to the power management system 160. Optionally, all or part of the reactant product from the reversible fuel cell system are transferred to the product storage device 230 via the reactant product conduit 220. Products that are not stored are released.

When the reversible fuel cell system 190 operates in the electrolysis mode, electrical energy from the power management system 160 is provided to system 190 and the reactant product from the product storage device 230 and/or from outside the electrochemical energy storage system 120 is provided via the reactant product conduit 220 to the system 190. The fuel is regenerated in the reversible fuel cell system 190 and provided to the fuel storage 210 via the fuel conduit 200.

Any suitable fuels, oxidizers and reactant product may be used. One preferred example for the fuel is hydrogen which is reacted with oxygen from ambient air to produce a water reactant product. However, other fuels and oxidants can be used. For example, a hydrocarbon gas, such as methane, may be used as a fuel to produce water and carbon dioxide reactant product. Other hydrocarbon gases, such as natural gas, propane, hexane, etc., may also be used as fuel. Furthermore, these hydrocarbon materials may be reformed into a carbon containing fuel, such as carbon monoxide, or previously supplied carbon monoxide may also be used as fuel.

If surplus energy is available from the electrical energy source 100 and an excess reactant product is supplied to the reversible fuel cell system 190, then the system 190 can generate more fuel than what is needed by the system 190 in the fuel cell mode. This excess fuel may be removed from the system 120 and provided for any suitable end use outside the system 120.

Figure 3:
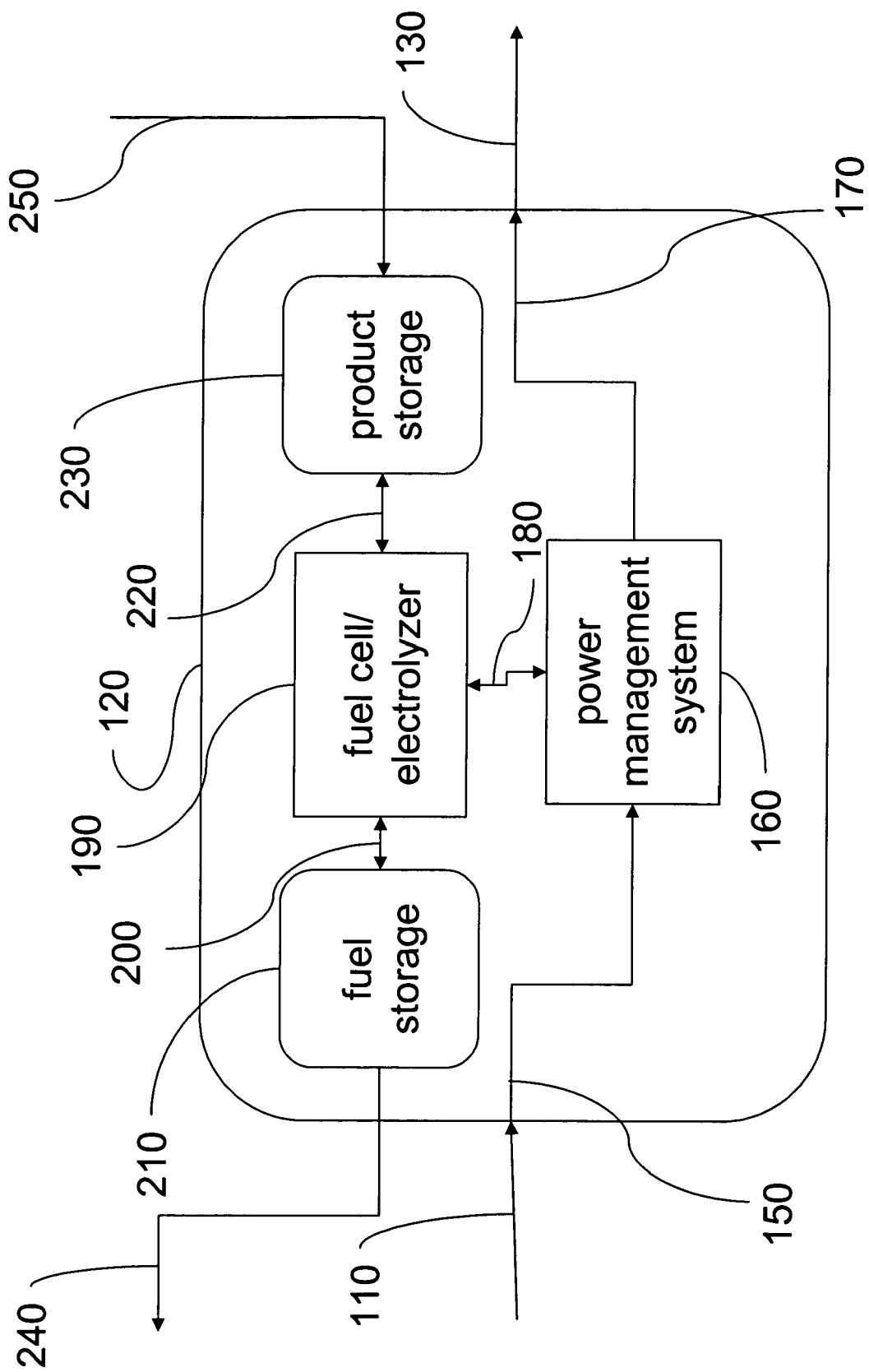
FIG. 3 is a schematic of an electrical energy storage system with a reversible fuel cell system, which can also generate fuel for use outside the electrical energy storage system.

FIG. 3 illustrates the system 120 when the excess reactant product is supplied to the system 120 and the excess fuel is removed from the system. The system 120 is identical to the system 120 illustrated in FIG. 2 with the exception of the fuel removal device 240 and the reactant product delivery device 250. Excess fuel is provided out of the system 120 through the fuel removal device 240, while the excess reactant product is replenished through reactant product delivery device 250. The devices 240 and 250 may comprise any suitable devices which may deliver fuel and reactant product.

For example, the fuel removal device 240 may be a gas or liquid conduit such as a pipe or hose which delivers fuel, such as hydrogen or methane, from the reversible fuel cell system 190 and/or from the fuel storage device 210 outside the system 120. Alternatively, the device 240 may comprise a movable gas or liquid storage container, such as a gas or liquid tank, which is physically removed from the system 120 after the container is filled with fuel. If the device 240 comprises a container, then the device 240 may be used as both the fuel storage device 210 while it remains in the system 120, and as a fuel removal device 240, when it is removed from the system 120.

The reactant product delivery device 250 may be one or more gas or liquid conduits which deliver reactant product, such as water and/or carbon dioxide to the system 120. For example, the device may comprise a water pipe or hose which delivers water to the product storage device 230 or directly to the reversible fuel cell system 190. The device 250 may comprise two conduits when the reactant product comprises two separate components, such as water and carbon dioxide. Alternatively, the device 250 may comprise a movable gas or liquid storage container, such as a gas or liquid tank, which is physically delivered to the system 120 filled with reactant product. If the device 250 comprises a container, then the device 250 may be used as both the reactant product storage device 230 while it collects reactant product during the fuel cell mode, and as a reactant product delivery device 250 when it provides reactant products during the electrolysis mode.

The reactant product delivery device 250 is adapted to supply excess reactant product to the reversible fuel cell system 190 operating in the electrolysis mode, in addition to or instead of the reactant product generated by the reversible fuel cell system in the fuel cell mode. In other words, the device 250 supplies the reactant product 250 in excess of the amount generated by the reversible fuel cell system 190 operating in the fuel cell mode. In one example, if the reactant product is water, then the water generated by the system 190 in the fuel cell mode is stored in the storage device 230 and the device 250 provides additional water to the device 230. In another example, the water generated by the system 190 in the fuel cell mode is discarded and the 250 provides water to the device 230 and/or to the system 190 in excess of the amount produced by the system 190 in the fuel cell mode.

In either example, the excess reactant product allows the system 190 to generate an amount of fuel in the electrolysis mode in excess of the amount of fuel required to operate the system 190 in the fuel cell mode over a predetermined number of operating cycles. Thus, while anomalies, such as breakdowns, early shut downs, etc., may occur during individual fuel cell mode and electrolysis mode cycles, when the system 190 is operated cyclically over a predetermined number of such cycles, such as over 10 cycles, for example over 100 to 1,000 cycles, the system 190 produces the excess fuel.

The reversible fuel cell system 190 may generate more fuel in the electrolysis mode than it consumes in the fuel cell mode over the predetermined number of cycles under several conditions. In a first preferred embodiment of the present invention, the reversible fuel cell system operates at a higher current level in the electrolysis mode than in the fuel cell mode over the predetermined number of cycles.

In a preferred aspect of the present invention, the reversible fuel cell system 190 includes a SORFC stack. It is desirable for the energy storage system 120 to operate at high round-trip efficiencies, which is the ratio of energy provided to the electrical energy consumer 140 to the electrical energy from source 100. In order to achieve high round-trip efficiencies, the SORFC is preferably operated at comparably low current densities thereby minimizing losses in the SORFC. Theoretically, the round-trip efficiency increases with decreasing current density. However, the SORFC should be maintained at an elevated operating temperature, which typically ranges between 600° C. and 1000° C. The losses within the SORFC can be used to provide make-up heat to keep the SORFC at the desired temperature. If the current and thereby the losses become too small, the desired operating temperature cannot be maintained. Therefore, a practical low limit for the current density exists in the electrolysis mode and in the fuel cell mode. This current density limit depends on the thermal losses from the system and the heat generated at a specific current.

Operation of a fuel cell at low current implies a fuel cell voltage close to the open circuit voltage (OCV), which is the fuel cell voltage at zero current. Operation below OCV implies power generation, while operation above OCV implies fuel regeneration/electrolysis. When the fuel cell is operated in the electrolysis mode, additional constraints on the minimum allowable current density can exist. In the example of water electrolysis at high temperature, operation of the fuel cell only slightly above OCV is an endothermic reaction. There is a minimum voltage for electrolysis, termed the thermal neutral voltage at which the electrolysis reaction is thermally neutral. In order to thermally sustain the SORFC without the use of thermal storage during electrolysis, electrolysis should be performed above the thermal neutral voltage. On the other hand, power generation can be performed very close to OCV. As a result the desired minimum current density for electrolysis is significantly larger than the desired minimum current for power generation in the fuel cell mode. The difference between the minimum currents depends on the thermal management system and the choice of fuel and oxidizer. In a SORFC without additional fuel generation, the current in power generation and electrolysis mode also should be balanced with respect to the available time for power generation and electrolysis. If, for example, energy is generated for 16 hours per day while fuel is regenerated for 8 hours per day, the current during regeneration has to be twice as large as the power generation current in order to balance fuel consumed and regenerated.

The two constraints for current densities outlined above generally lead to different values for the minimum current density in the fuel cell and electrolysis modes. As a result of the higher current density in the electrolysis than in fuel cell mode, the energy storage system 120 typically has additional/unused fuel regeneration capacity. If additional or excess power or electrical energy and reactant product is available during fuel regeneration in the electrolysis mode, this excess fuel generation capacity can be utilized to generate additional fuel, which can be used outside the electrical energy storage system.

Thus, the system 120 may be used as a regenerative power supply to remote residences or commercial operations or to residences or commercial operations connected to the power grid. The electrical power generator has to be sized to meet the peak load of the user. This sizing requirement allows a surplus of fuel to be generated during charge times. Examples include, but are not limited to systems sized to meet high electrical power peak demands which occur during less than 100 percent of the system operation in the fuel cell mode or systems with relatively low energy consumption (i.e., below the maximum possible energy consumption) during the fuel cell mode.

Thus, in one preferred aspect of the first embodiment, the reversible fuel system 190 is operated at a load lower than a peak load that the reversible fuel cell system is capable of providing at least during a portion of a time that the reversible fuel cell system operates in the fuel cell mode. Thus, the reversible fuel system 190 is operated for at least a portion of its fuel cell mode at a current density below its peak or maximum possible current density. In contrast, the reversible fuel system 190 is operated at a higher current density, such as at a peak current density, in the electrolysis mode to produce the excess fuel.

Since the systems 120, 190 are designed and sized for a desired energy storage, the size of the fuel cell stack and the size of the balance of plant are based on the desired energy storage. Thus, the size of the fuel cell stack is based on the minimum number of fuel cells that operate in the fuel cell mode to provide the desired peak power, rather than on the number of fuel cells or electrolyzers that are required for the electrolysis mode. Thus, extra fuel cells or stacks may be required ensure that the system 120 provides the desired peak power in the fuel cell mode during a worst case scenario. However, the energy generation capability of all of the fuel cells may not be used in the fuel cell mode outside of the worst case scenario. In contrast, the fuel regeneration capability of all fuel cells may be used during electrolysis mode to regenerate the fuel needed for future fuel cell mode(s) and to generate excess fuel for use outside the system 120.

In another preferred aspect of the first embodiment, the reversible fuel cell system 190 is electrically connected to an electrical energy source 100 which comprises a photovoltaic energy generation system which provides electrical energy to the reversible fuel cell system during daytime to generate and store fuel. The photovoltaic energy generation system also provides electrical energy to the consumer 140, as illustrated in FIG. 1. The reversible fuel cell system 190 generates electrical energy during night time from the stored fuel and provides this electrical energy to the consumer 140 during night time. Often, the night time load on the reversible fuel cell system 190 is lower than a peak load that the reversible fuel cell system is capable of providing, at least during a portion of the night time period. Thus, the reversible fuel system 190 is operated in the fuel cell mode during at least a portion of the night time period at a current density below its peak current density. In contrast, the reversible fuel system 190 is operated at a higher current density, such as at a peak current density, in the electrolysis mode during the day time period to produce the excess fuel.

In a second preferred embodiment, the reversible fuel cell system 190 operates for a longer duration in the electrolysis mode than in the fuel cell mode over the predetermined number of cycles. This difference in operating time may be used to produce the excess fuel. For example, the system 190 may operate during one portion of the electrolysis mode to regenerate sufficient fuel for the entire next fuel cell mode period, and then operate for the remainder of the electrolysis mode period to produce the excess fuel.

Examples of the second embodiment include system 190 operation where charging and discharging follows a day/night cycle. Such a system often operates with a photovoltaic electrical energy source 100 described above. If the night time discharge period is shorter than the day time charge period, a surplus or excess fuel can be generated.

Another example is where the system 190 is used to provide emergency backup power when the electrical energy source 100 is unable to provide electrical energy to the consumer 140. For example, the system 190 may be used as a backup power source for a time when an electrical grid energy source 100 stops providing electrical energy. In this example, the system 190 operates at least 90 to 99 percent of the time in the electrolysis mode and occasionally operates in the fuel cell mode when the source 100 does not provide electrical energy. Thus, the system 190 is used as an electrolyzer which provides fuel for non-system uses and as an emergency backup power generator. This mode of operation reduces the cost of the emergency backup energy generation system.

If desired, the first and second embodiments may be combined, and the system 190 may operate in the electrolysis mode for a longer time period and at a higher current density than in the fuel cell mode.

In a third preferred embodiment, the reversible fuel cell system 190 is electrically connected an electrical energy source 100 which comprises a renewable energy source. Any suitable renewable energy source may be used. An excess capacity of the renewable energy source is used to provide electrical energy to the reversible fuel cell operating in the electrolysis mode to generate the excess fuel. Different renewable energy sources have different types of excess capacities.

In one example, the renewable energy source 100 may comprises a photovoltaic system, such as a solar cell array. The photovoltaic system contains extra capacity during a first portion, such as the first 95 to 99.9 percent, of its designed lifespan. In other words, the capacity of the photovoltaic system decreases as the system ages during its life span. Thus, a photovoltaic system is often designed to provide a desired amount of electrical energy based on the remaining second portion of its expected lifespan, to prevent the photovoltaic system from providing an insufficient amount of electrical energy in the second portion of its expected life span. Therefore, the photovoltaic system is designed and sized to provide electrical energy in excess of that required by the consumer and that required by the reversible fuel cell system 190 to regenerate fuel for operation in the fuel cell mode. The excess capacity of the photovoltaic system during the first portion, such as the 95 to 99.9 percent, of its life span may be used to provide electrical energy to the reversible fuel cell system 190 to generate the excess fuel.

In another example, the photovoltaic system 100 is designed and sized to provide a sufficient amount of electrical energy required by the consumer and required by the reversible fuel cell system 190 to regenerate fuel for operation in the fuel cell mode over a predetermined number of day and night cycles, even if a large amount of days are cloudy. In other words, the photovoltaic system 100 is designed to provide a sufficient amount of electrical energy in a worst case weather scenario, such as when a predetermined percent, X, of day time periods are cloudy. However, the worst case weather scenario occurs occasionally. Thus, when less than X percent of day time periods are cloudy, and the system 190 is fully recharged for operation in the next fuel cell mode period or periods, the photovoltaic system 100 may be used to provide electrical energy to system 190 to generate excess fuel during the excess sunny portions of the day time periods. For example, the photovoltaic system 100 is designed and sized to provide a sufficient amount of electrical energy required by the consumer and required by the reversible fuel cell system 190 in the winter, when the number of sunny days is at a minimum and/or when the day length is shortest compared to the night length. Thus, there is no sufficient sunlight during X percent of the time during winter. The photovoltaic system 100 has excess capacity in the summer, when there is no sufficient sunlight during only X-Y percent of the time. The photovoltaic system 100 may be used to provide electrical energy to system 190 to generate excess fuel during Y percent of the time during the summer.

In another example, the renewable energy source 100 may comprise a wind turbine system which is designed to provide a minimum amount of electrical energy at a predetermined wind speed. Such systems often contain rotatable blades coupled to a generator which generates electricity when the wind rotates the blades. This system 100 contains extra capacity during periods when the wind speed exceeds a predetermined wind speed.

The wind turbine system 100 is designed and sized to provide a sufficient amount of electrical energy required by the consumer and required by the reversible fuel cell system 190 to regenerate fuel for operation in the fuel cell mode over a predetermined number of cycles, even if a there is no wind or the wind speed is low during a large portion of a predetermined number of cycles. In other words, the system 100 is designed to provide a sufficient amount of electrical energy in a worst case weather scenario, such as when a predetermined percent, X, of the time there is no wind or the wind speed is lower than desirable. However, the worst case weather scenario occurs occasionally. Thus, when less than X percent of the time period has little or no wind and the system 190 is fully recharged for operation in the next fuel cell mode period or periods, the system 100 may be used to provide electrical energy to system 190 to generate excess fuel during the excess windy portions of the time period. For example, if X-Y percent of the time period has no wind or insufficient wind, then the system 100 may be used to provide electrical energy to system 190 to generate excess fuel during Y percent of time period.

In another example, the renewable energy source 100 may comprise a tidal energy generation system which is designed to provide a minimum amount of electrical energy at a predetermined tidal force. Such a system 100 contains movable members, such as plates, located under a body of water, such as a sea, ocean or lake. The movable members are connected to a generator. The movable members are moved by the tides and the movement causes the generator to generate electricity. This system contains extra capacity during periods when the tidal force exceeds the predetermined tidal force.

The tidal energy generation system 100 is designed and sized to provide a sufficient amount of electrical energy required by the consumer and required by the reversible fuel cell system 190 to regenerate fuel for operation in the fuel cell mode over a predetermined number of cycles, even if a there is no tide or the tidal force is low during a large portion of a predetermined number of cycles. In other words, the system 100 is designed to provide a sufficient amount of electrical energy in a worst case tidal scenario, such as when a predetermined percent, X, of the time the tidal force is lower than desirable. However, the worst case tidal scenario occurs occasionally. Thus, when less than X percent of the time period has insufficient tidal force and the system 190 is fully recharged for operation in the next fuel cell mode period or periods, the system 100 may be used to provide electrical energy to system 190 to generate excess fuel during the excess high tidal force portions of the time period. For example, if X-Y percent of the time period has insufficient tidal force, then the system 100 may be used to provide electrical energy to system 190 to generate excess fuel during Y percent of time period.

In another example, the renewable energy source 100 may comprise a geothermal energy generation system which is designed to provide a minimum amount of electrical energy at a predetermined geothermal energy. Such a system 100 uses the heat and/or steam emitted from the earth and converts the heat and/or steam into electrical energy. This system contains extra capacity during periods when the geothermal energy exceeds a predetermined, worst case thermal energy supply scenario. For example, ambient losses for the geothermal energy differ between warm summer ambient temperatures and cold winter ambient temperatures.

Thus, as described above, co-production of fuel in an energy storage device using a fuel regenerating device can be realized in any situation where the fuel consumed during discharge is less than the fuel regenerated during charging periods, preferably over a predetermined number of charge and discharge cycles. The system 190 generates fuel during the entire electrolysis mode time period. From about 1 to about 99 percent of the generated fuel, such as about 10 to about 30 percent of the generated fuel is excess fuel which may be used for non-system 120 uses, while the remaining fuel may be used to operate the system 190 in the fuel cell mode.

It is preferred, but not required to use the system 120 with a renewable energy source 100 in remote locations that are not connected to the power grid. In this case, the reversible fuel cell system 190 of the electrical energy storage system 120 may be used to generate fuel for air, land or water vehicles. A vehicle fuel infrastructure is not required in this case and the system 120 may be used to supply the necessary fuel to power the vehicles at the remote location. For example, the vehicles may be powered by hydrogen, methane or other hydrocarbon fuel. Furthermore, since the system 190 may be used to generate electricity and an environmentally clean fuel, such as hydrogen, without emission of greenhouse gases and carbon dioxide, the system 190 improves the environment and reduces the emission of greenhouse gases for transportation and other uses.

The excess generated fuel may be used for any suitable application outside the system 120. For example, the excess fuel may be provided to power an airborne vehicle, such as a rocket, airplane, helicopter or blimp, a water based vehicle, such as a ship or submarine, a land based vehicle, such as a car, truck, motorcycle, tank or train, a chemical reaction in a chemical manufacturing process, such as a semiconductor manufacturing or chemical production process, or a heating system of a building, such as a commercial building, including office buildings, factories and hospitals and a residential building.

In another preferred embodiment of the present invention, the equilibrium operating temperature of the reversible fuel cell system 190, such as a fuel cell stack, in the electrolysis mode is selected independently from the equilibrium operating temperature of the fuel cell stack in the fuel cell mode to optimize the amount and/or cost of the fuel produced in the electrolysis mode. Thus, in this embodiment, the equilibrium operating temperature of the fuel cell stack in the electrolysis mode is preferably, but not necessarily different from the equilibrium operating temperature of the fuel cell stack in the fuel cell mode.

In one preferred aspect, the equilibrium operating temperature of the fuel cell stack in the electrolysis mode may be selected to optimize or maximize the amount of fuel produced. In another preferred aspect, the equilibrium operating temperature of the fuel cell stack in the electrolysis mode may be selected to optimize or minimize the unit cost of the fuel produced. In this aspect, in certain situations, depending on different fuel cell stack design and operating variables, one or more minima may be observed on a curve of unit fuel cost versus amount of fuel produced. The equilibrium operating temperature of the fuel cell stack in the electrolysis mode may be optimized to operate at or near one of the minima on this curve. In another preferred aspect, the equilibrium operating temperature of the fuel cell stack in the electrolysis mode is selected to maximize the amount of fuel produced during some time periods, such as during periods of high fuel demand or price, and at other time periods it is selected to minimize the fuel unit cost, such as during periods of low fuel price or demand. Thus, the equilibrium operating temperature of the fuel cell stack in the electrolysis mode may be higher or lower than that in the fuel cell mode depending on the desired optimized condition, such as fuel amount or fuel unit cost.

Preferably, the equilibrium operating temperature of the fuel cell stack in the electrolysis mode is obtained by adjusting the current density provided to the fuel cell stack for a given reactant product flow rate. For example, the power management system 160 may be used to control the current density provided to the fuel cell stack (i.e., the reversible fuel cell system 190). As discussed above, the system 160 may be any suitable control system, such as a computer or microprocessor. Alternatively, the system 160 may comprise a manual current density control system, such as a manually rotated knob, lever, dial or one or more push buttons.

Alternatively, the equilibrium operating temperature of the fuel cell stack may be adjusted by other methods. For example, the current density may be held constant while the reactant product flow rate may be adjusted manually or automatically by a controller, such as by a manual or automatic valve. If desired, both the current density and the reactant product flow rate may be adjusted to select the desired temperature.

The selection of an optimum equilibrium operating temperature of the fuel cell stack in the electrolysis mode independent of the equilibrium operating temperature of the fuel cell stack in the fuel cell mode provides an operational advantage. As noted above, in order to thermally sustain the SORFC without the use of thermal storage during electrolysis, electrolysis should be performed above the thermal neutral voltage. Thus, the thermal losses keep the fuel cell stack at a desired temperature. If the fuel cell stack is used to generate fuel for use outside the system during electrolysis, the total amount of heat generated in the electrolysis mode is the same. However, some of the heat is used to generate the excess fuel rather than being lost, which reduces the thermal losses and provides an operational cost advantage for the fuel cell stack that is used to generate excess hydrogen.

As discussed above, the reversible fuel cell system 190 may comprise any suitable system, such as a SORFC system, a PEM system or fuel cell/electrolyzer pairs and may be used with any suitable electrical energy source 100 described above, such as a power grid or a renewable energy source. A SORFC stack is the preferred reversible fuel cell system 190.

Figure 4:
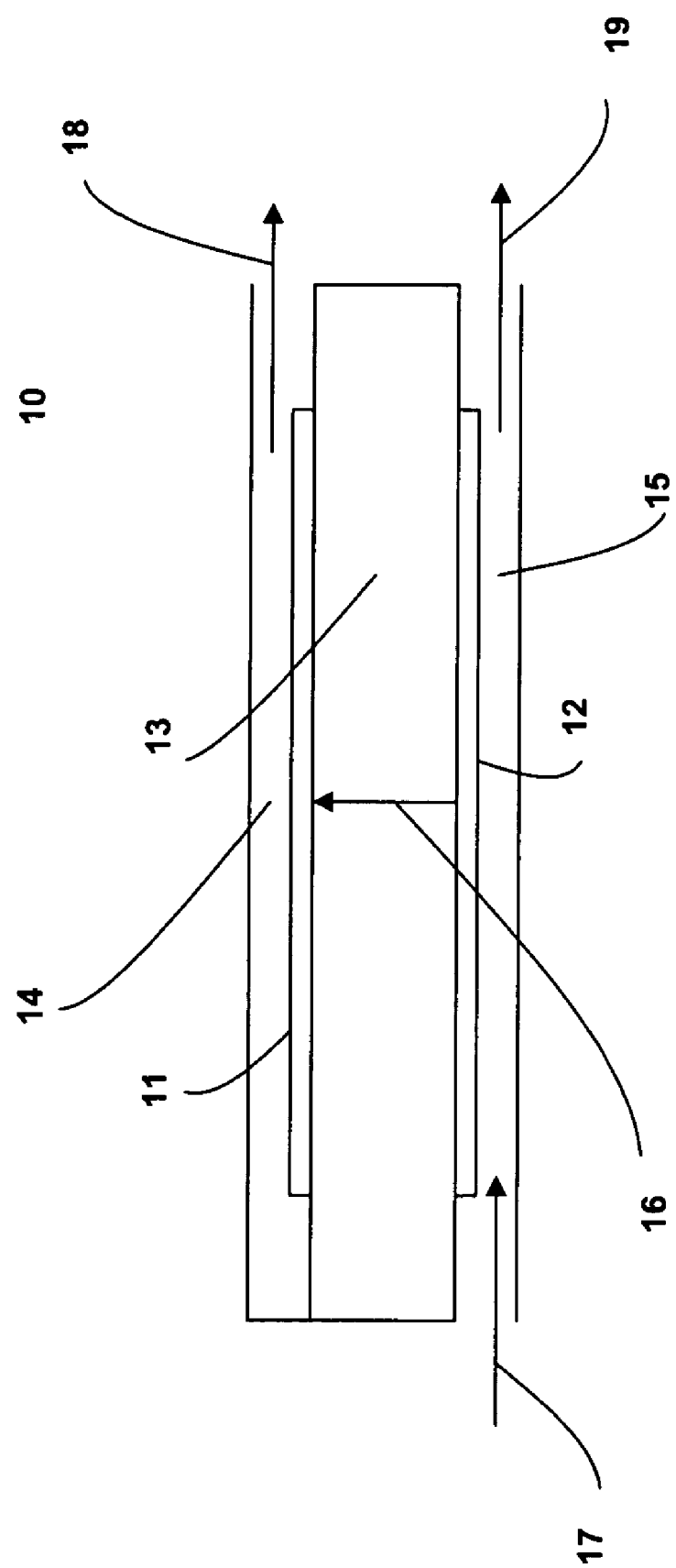
FIG. 4 is a schematic cross section of a single SORFC operating in the electrolysis mode according to a preferred embodiment of the present invention.

A single SORFC 10 operating in the electrolysis mode is shown in FIG. 4. The SORFC contains an anode electrode 11, an electrolyte 13 and a cathode electrode 12. An anode gas chamber 14 is formed between the electrolyte 13 and an anode side interconnect (not shown for simplicity). A cathode gas chamber 15 is formed between the electrolyte 13 and a cathode side interconnect (also not shown for simplicity).

A reaction product gas mixture 17 may contain primarily water if hydrogen is used as a fuel. Alternatively, the reaction product gas mixture 17 may contain primarily water vapor and carbon dioxide if a carbon containing gas or liquid is used as a fuel. The reaction product gas mixture 17 is introduced into the cathode gas chamber 15. A direct current power source (not shown) is connected to the anode electrode 11 and the cathode electrode 12 in such a way that when electrical current is flowing, the anode electrode 11 takes on a positive voltage charge and the cathode electrode 12 takes on a negative voltage charge. When the electric current is flowing, the gas mixture 17 gives up oxygen ions 16 to form cathode discharge mixture 19 consisting primarily of hydrogen and optionally carbon monoxide if mixture 17 contained carbon dioxide. Oxygen ions 16 transport across the electrolyte 13 under the electrical current. The oxygen ions 16 are converted into the oxidant, such as oxygen gas 18 on the anode electrode 11 under the influence of the electrical current. The oxygen gas 18 is discharged from the anode chamber 14, while the electrolysis product (e.g., hydrogen and optionally carbon monoxide) is collected from the cathode chamber.

Figure 5:
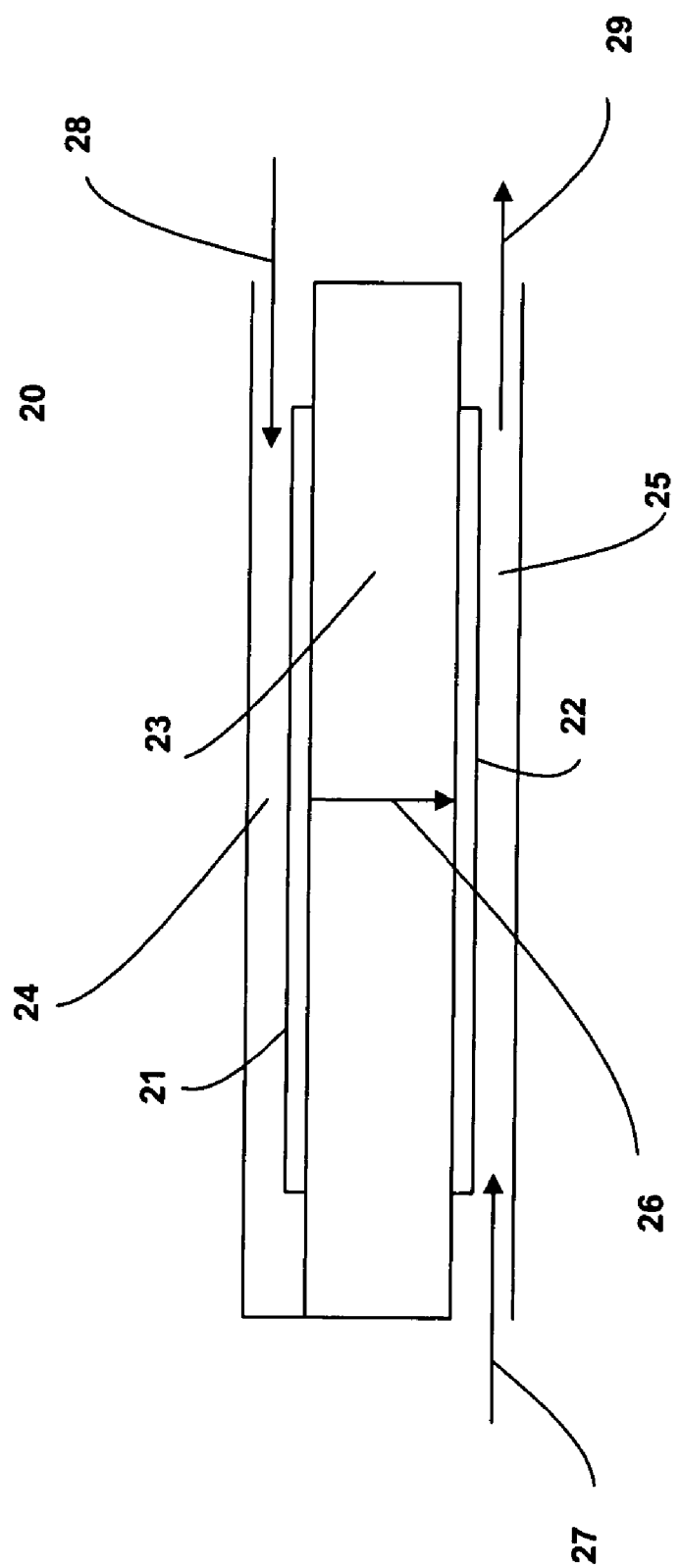
FIG. 5 is a schematic cross section of a single SORFC operating in the fuel cell mode according to a preferred embodiment of the present invention.

A single SORFC 20 operating in the fuel cell mode is shown in FIG. 5. SORFC 20 is the same as SORFC 10, except that the cathode and anode designations of its electrodes are reversed. Cathode electrode 21 is the same electrode as that identified as the anode electrode 11 in FIG. 4 when operating in the electrolysis mode. Anode electrode 22 is the same electrode as that identified as the cathode electrode 12 in FIG. 4 when operating in the electrolysis mode. Solid oxide electrolyte 23 is the same electrolyte as that identified as electrolyte 13 in FIG. 4 when operating in the electrolysis mode. Cathode gas chamber 24 is the same gas chamber as that identified as the anode gas chamber 14 in FIG. 4 when operating in the electrolysis mode. Anode gas chamber 25 is the same gas chamber as that identified as the cathode gas chamber 15 in FIG. 4 when operating in the electrolysis mode.

A fuel gas 27 is introduced into the anode gas chamber 25. Oxygen gas 28 is introduced into the cathode chamber 24. The fuel may comprise hydrogen, a hydrocarbon gas, such as methane, and/or carbon monoxide. Water may be added to the fuel if desired. An electrical fuel cell load (not shown) is applied to the SORFC 20 and the oxygen gas 28 forms oxygen ions 26 under the influence of the electrical load. Oxygen ions 26 transport across the electrolyte 23 under the influence of the electrical current. On the anode electrode 22, the oxygen ions 26 combine with hydrogen and optionally carbon, if present, from gas mixture 27 to form gas mixture 29 containing water vapor and optionally carbon dioxide, if a carbon containing gas is present in the fuel 27. Gas mixture 29 is discharged from the anode chamber and stored as the reaction product. In the process described above, the SORFC 20 has made electrical energy or power, which is output through its electrodes.

Figure 6:
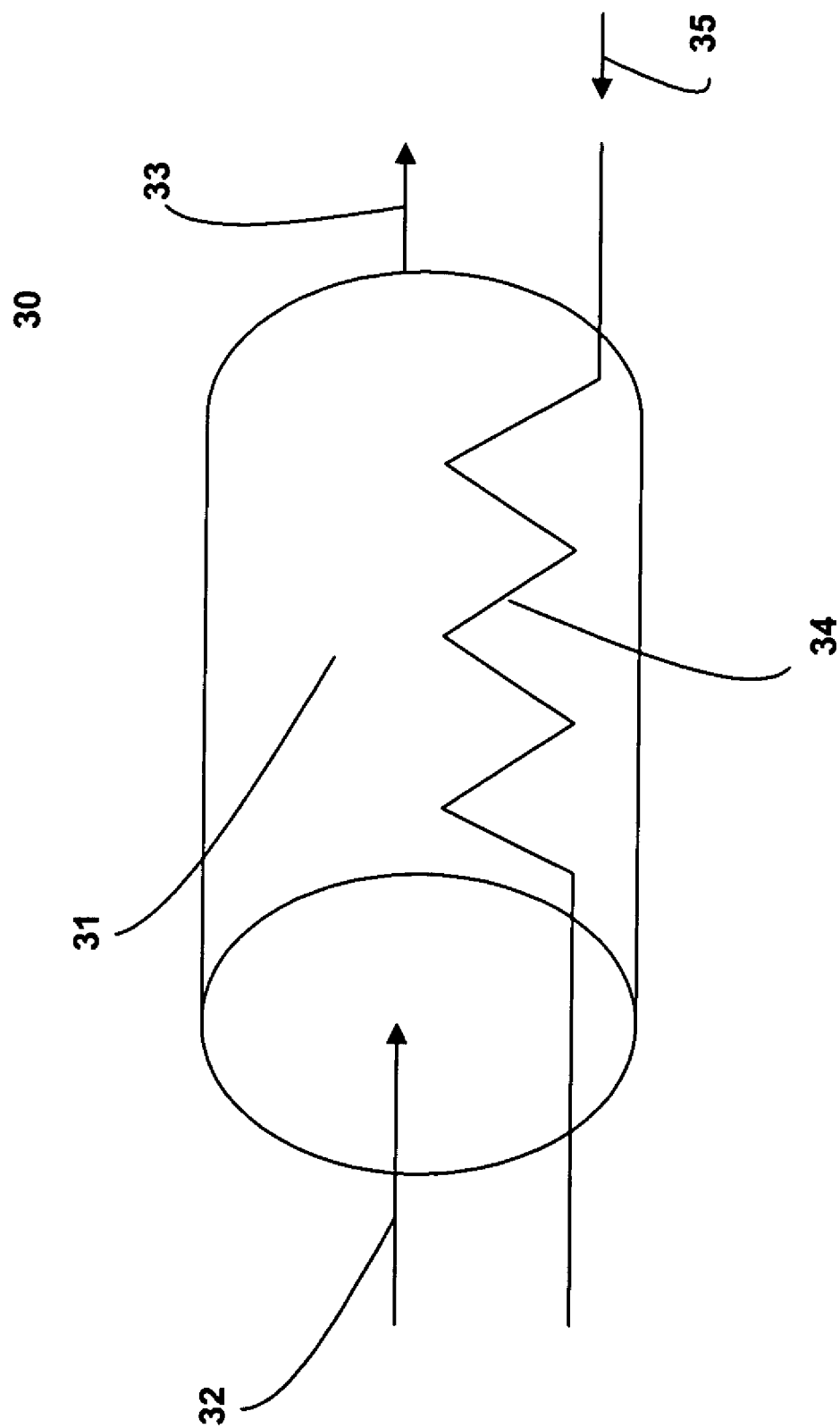
FIG. 6 is a schematic side of view of a Sabatier reactor according to a preferred embodiment of the present invention.

An optional Sabatier reactor subsystem 30 to be used when the fuel comprises methane is shown in FIG. 6. The reactor tube 31 contains a catalyst, such as a platinum family metal on an alumina support. Preferably, the catalyst comprises ruthenium. A gas mixture 32 consisting primarily of hydrogen and carbon monoxide is introduced into reactor tube 31 and contacts the catalyst therein. The gas mixture 32 undergoes an immediate exothermic reaction and produces gas mixture 33 consisting primarily of methane and water vapor. Gas mixture 33 is then discharged from the reactor tube 31. When the Sabatier reactor is used with the SORFC 10 operating in the electrolysis mode, the hydrogen and carbon monoxide discharge mixture 19/32 is provided from the SORFC into the Sabatier reactor 30.

Because the reaction within reactor tube 31 is highly exothermic, a heat exchanger 34 located in or adjacent to tube 31 is used to capture the generated heat. Gas mixture 35, consisting primarily of carbon dioxide and water, flows through heat exchanger 34 to absorb the exothermic reaction heat. When the Sabatier reactor is used with the SORFC 10 operating in the electrolysis mode, the water vapor and carbon dioxide inlet mixture 17/35 is heated in the Sabatier reactor by the reaction of the outlet or discharge mixture 19/32. The water vapor and carbon dioxide inlet mixture 17/35 is then provided from the Sabatier reactor into the SORFC 10.

Figure 7:
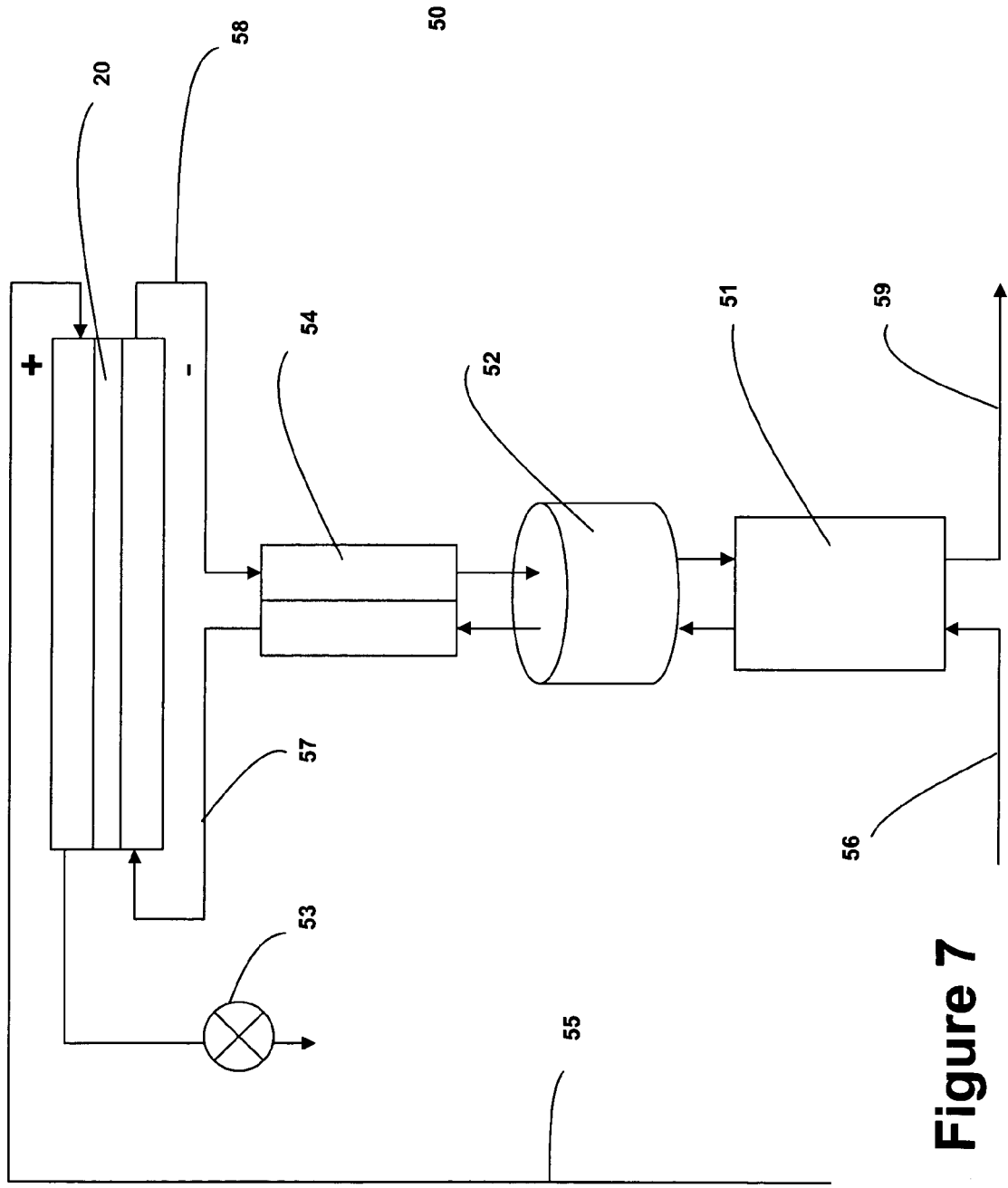
FIG. 7 is a system schematic of the major SORFC components operating in the fuel cell mode, according to a preferred embodiment of the present invention.

The SORFC system 50 of a preferred embodiment operating in a fuel cell mode is shown of FIG. 7 as a simplified schematic. The system 50 as shown operates with methane as a fuel. However, if desired, a hydrogen fuel may be used instead, as discussed above. A single SORFC 20 previously shown in FIG. 5 as a cross section operating in the fuel cell mode is shown again in FIG. 7. While a single SORFC is shown, it should be understood that the system 50 contains a plurality of SORFC stacks. A hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

An enthalpy recovery unit 52 transfers water vapor from first gas stream to a second gas stream. The enthalpy recovery unit 52 can be a device which transfers water vapor based on cyclic desiccant beds or a rotating desiccant wheel. The desiccant wheel (i.e., "enthalpy wheel") is preferred. An optional purge valve 53, such as a normally closed powered open solenoid valve may be used if pure oxygen is used. A heat exchanger 54 is a counter flow gas-gas heat exchanger. The SORFC power output, such as output electrode(s), is connected to a power distribution system. The oxidizer (i.e., oxygen or air) enters the system 50 through the oxidizer inlet or conduit 55, while the fuel enters the system through the fuel inlet or conduit arrangement 56/57. The fuel exhaust exits through conduit arrangement 58/59.

A method of operating the system 50 in the fuel cell mode is now described. Within the SORFC system 50 shown in FIG. 7, oxidizer, such as pure oxygen reactant gas from an oxygen storage vessel, such as a liquid oxygen tank, or air, is delivered to the cathode chamber of SORFC 20 through inlet conduit 55. If oxygen reactant is highly pure, then it is normally dead headed within the cathode chamber of SORFC 20. However, even the purest of gases will include trace non reactant gas species. As a result the cathode chamber of SORFC 20 should be occasionally purged of these non reactant species. Oxygen purge valve 53 is used to accomplish this purging.

High purity hydrocarbon inlet stream, such as a methane stream, is introduced into the SORFC system 50 from a hydrocarbon storage vessel, such as a tank (not shown for clarity), through conduit 56 into the hydrogen recovery unit 51. As noted above, a hydrogen fuel inlet stream may be used instead. Within the hydrogen recovery unit 51, hydrogen gas is transferred from the fuel exhaust outlet stream in conduit 58 into the methane stream. This hydrogen supports a uniform methane reformation process within the anode chamber of SORFC 20. The methane and hydrogen mixture next is introduced into the enthalpy recovery unit 52, where a portion of the water vapor is transferred from the fuel exhaust outlet stream in conduit 58 into the methane and hydrogen inlet stream. Preferably, the enthalpy recovery unit also transfers heat from the outlet stream to the inlet stream. From the enthalpy recovery unit 52, the methane, hydrogen and water vapor mixture is introduced into the heat exchanger 54, where the gas mixture temperature is increased near to the operational temperature of 600C to 1000C using the high temperature waste heat from the outlet stream in conduit 58. From heat exchanger 54, the hot mixture of methane, hydrogen, and water vapor is delivered to the anode chamber of SORFC 20 through conduit 57. Some steam reformation of the methane will occur in the heat exchanger 54 and conduit 57 but the amount is suppressed by the existence of the hydrogen. The completion of the steam reforming of the methane is accomplished in the anode chamber of the SORFC 20.

Within the anode chamber of the SORFC 20, the steam reforming of methane and the oxidation of carbon and hydrogen in the fuel cell reactions converts the discharged gas mixture (i.e., fuel exhaust) in conduit 58 to carbon dioxide, additional water vapor, and excess hydrogen. If hydrogen rather than methane is used as a fuel, then no carbon dioxide is produced. The discharged gas mixture in conduit 58 passes through heat exchanger 54, releasing waste heat, and then through the enthalpy recovery unit 52 to supply a portion of the water vapor to support the input methane reformation. The discharged gas mixture in conduit 58 is then directed to the hydrogen recovery unit 51 where virtually all but trace quantities of the hydrogen is transferred to the inlet fuel stream. Using the preferred electrochemical proton exchange process as the hydrogen recovery unit 51, provides an exact measure of the hydrogen content within the discharged gas mixture in conduit 58 which is used to adjust the input methane flow rate. The outlet mixture in conduit 59 from hydrogen recovery unit 51 contains only carbon dioxide and water which are stored separately (not shown).

Figure 8:
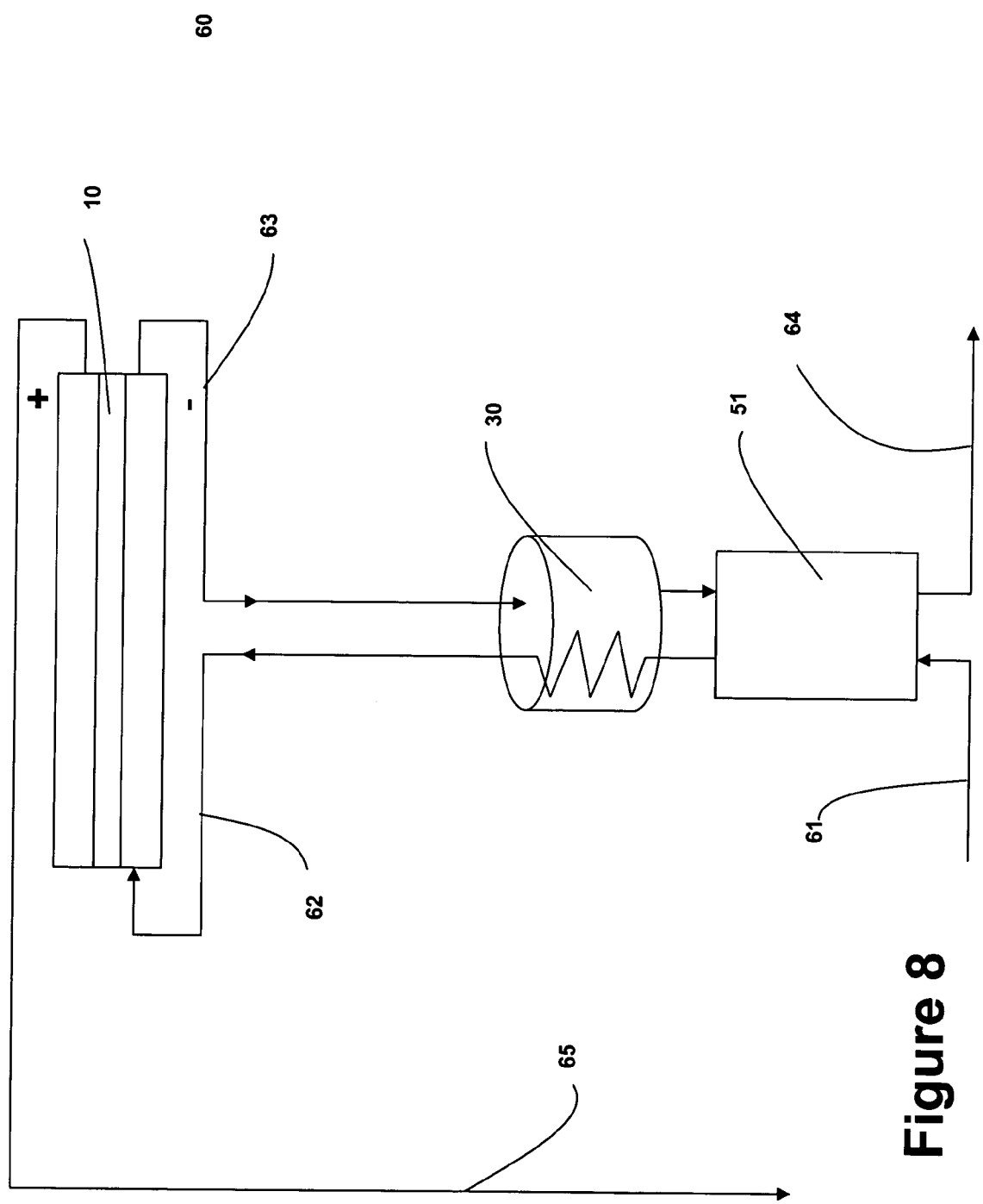
FIG. 8 is a system schematic of the major SORFC components operating in the electrolysis mode, according to a preferred embodiment of the present invention.

The SORFC system 60 of a preferred embodiment operating in an electrolysis mode is shown of FIG. 8 as a simplified schematic. A single SORFC 10 previously shown in FIG. 4 as a cross section operating in the electrolysis mode is shown again in FIG. 8. The hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

If methane is used as a fuel, then the system 60 also includes the Sabatier reactor subsystem 30, described with respect to FIG. 6, which converts carbon monoxide and hydrogen into methane and water vapor. If methane is used as a fuel, then the reactant product comprising carbon dioxide and water enter the system 60 through inlet or conduit 61, which may be the same or different than conduit 56, shown in FIG. 7. If hydrogen is used as a fuel, then water is used as a reactant product. The generated oxygen exits through outlet or conduit 65, while the methane and water exit through outlet or conduit arrangement 63/64. Conduits 63/64 and 65, respectively, may be the same or different conduits as conduits 58/59 and 55, respectively, shown in FIG. 7.

Thus, the system 60 operating in the electrolysis mode is the same system as system 50 operating in the fuel cell mode, except that the inlet and outlet streams are steered through the optional Sabatier reactor subsystem 30 instead of through the heat exchanger 54 and the enthalpy recovery unit 52, which remains inactive in the electrolysis mode. The inlet and outlet streams may be steered using valves and parallel conduits (not shown for clarity). Furthermore, the electrode designations in the SORFC 10 of system 60 are reversed compared to SORFC 20 of system 50, as explained in detail with respect to FIGS. 1 and 2 above.

A method of operating the system 60 in the electrolysis mode is now described. If methane is used as a fuel, then carbon dioxide and water are introduced into the SORFC system 60 through conduit 61 into hydrogen recovery unit 51. Carbon dioxide may be introduced from a carbon dioxide storage vessel or from a conduit. If hydrogen is used as a fuel, then the carbon dioxide is omitted. Within the hydrogen recovery unit 51, hydrogen gas is transferred from the outlet stream in conduit 63 into the carbon dioxide and water inlet stream. This extra hydrogen eventually assures that all the carbon bearing gases are converted into methane within the Sabatier reactor subsystem 30. The carbon dioxide, water, and hydrogen inlet mixture next is introduced into the Sabatier subsystem 30 heat exchanger where it is heated by the exothermic reaction. From the Sabatier subsystem 30, the carbon dioxide, hydrogen and water vapor mixture is delivered to the cathode chamber of SORFC 10 through conduit 62. Within the cathode chamber of SORFC 10, the carbon dioxide and water vapor are reduced by electrolysis to carbon monoxide and hydrogen. Excess water and some unreacted carbon dioxide will be discharged from the cathode chamber of SORFC 10 along with the carbon monoxide and hydrogen through conduit 63.

The discharged gas mixture in conduit 63 passes through the Sabatier subsystem 30 to convert all the carbon oxides to methane and water with the excess hydrogen. If hydrogen is used as a fuel, then the Sabatier subsystem 30 is omitted and the discharged water vapor comprises the reactant product. The discharged gas mixture in conduit 63 is then directed to the hydrogen recovery unit 51 wherein virtually all but trace quantities of the hydrogen is transferred to the inlet carbon dioxide and water stream. Using the preferred electrochemical proton exchange process as the hydrogen recovery unit 51, provides an exact measure of the hydrogen content within the discharged gas mixture in conduit 63 which is used to adjust the input carbon dioxide flow rate. The outlet mixture in conduit 64 from hydrogen recovery unit 51 contains only methane and water which are stored separately (not shown). If desired, the water may be discharged and fresh water from a water pipe may be used for the SORFC reactions.

In the meantime, pure oxygen gas is generated in the SORFC 10 anode during the electrolysis process. The oxygen is discharged from the SORFC 10 anode through conduit 65 and on to discharge, direct metabolic use and/or to liquefied storage (not shown).

The Sabatier reactor which generates methane is advantageous because it operates at a temperature of about 400-900° C. degrees, which is a suitable temperature for heating the inlet stream being provided into the SORFC to or near to a desired SORFC operating temperature. However, other reactors which generate hydrocarbon gases other than methane may be used instead of the Sabatier reactor.

For example, reactors which convert an exhaust gas which contains hydrogen and carbon oxides, such as carbon monoxide and/or carbon dioxide, and optionally water, to methanol may be used instead. The methanol reactors typically, but not necessarily, contain a copper catalyst which converts hydrogen, carbon oxides and/or water vapor to methanol. These reactors may be catalyst bed type reactors, such as ARC reactors, quench converters, tube cooled converters, isothermal reactors where a continuous catalyst bed surrounds a spiral wound heat exchanger, and other suitable reactor types.

The following exothermic reactions are involved in the synthesis of methanol: $CO+2H_2=CH_3OH$; $CO_2+3H_2=CH_3OH$ and $CO+H_2O=CO_2+H_2$. The use of a SORFC operating in the electrolysis mode to generate methanol is advantageous because the SORFC exhaust gas contains a similar composition to synthesis gas that is used as a source gas for methanol production. The synthesis gas is usually specially prepared in a separate catalytic steam reforming of natural gas in conventional methanol synthesis process.

If desired, additional reactors may be present downstream of the Sabatier or methanol reactors to further purify the methane or methanol if desired. Alternatively, the additional reactors may be used to convert methane or methanol to other hydrocarbon gases, such as ethane, propane, octane, formic acid, formaldehyde and/or other suitable hydrocarbon gases. These hydrocarbon gases may be used as a fuel for the SORFC in the fuel cell mode and/or may be removed from the SORFC system for other use, sale or storage. Thus, the SORFC system may be used to generate various hydrocarbon fuels for storage or sale when the system is not generating power in the fuel cell mode. Alternatively, suitable reactors may be used to convert the hydrogen and carbon oxide containing SORFC electrolysis mode exhaust to the other hydrocarbon gases, such as ethane, propane, octane, formic acid, formaldehyde and/or other suitable hydrocarbon gases.

The SORFC systems described herein may have other embodiments and configurations, as desired. Other components, such as fuel side exhaust stream condensers, heat exchangers, heat-driven heat pumps, turbines, additional gas separation devices, hydrogen separators which separate hydrogen from the fuel exhaust and provide hydrogen for external use, fuel preprocessing subsystems, fuel reformers and/or water-gas shift reactors, may be added if desired, as described, for example, in U.S. application Ser. No. 10/300,021, filed on Nov. 20, 2002, in U.S. Provisional Application Ser. No. 60/461,190, filed on Apr. 9,2003, and in U.S. application Ser. No. 10/446,704, filed on May 29, 2003 all incorporated herein by reference in their entirety.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. An electrochemical system, comprising:
   a reversible fuel cell system which generates electrical energy and reactant product from fuel and oxidizer in a fuel cell mode, and which generates the fuel and oxidant from the reactant product and the electrical energy in an electrolysis mode;
   a first means for providing excess reactant product to the reversible fuel cell system operating in the electrolysis mode from outside the electrochemical system, in addition to or instead of the reactant product generated by the reversible fuel cell system in the fuel cell mode, such that fuel in excess of fuel required to operate the reversible fuel cell system in the fuel cell mode is generated in the electrolysis mode over a predetermined number of operating cycles; and a second means for removing the excess fuel generated by the reversible fuel cell system operating in the electrolysis mode from the electrochemical system.

2. The system of claim 1, further comprising a renewable energy source electrically connected to the reversible fuel cell system, such that an excess capacity of the renewable energy source is used to provide electrical energy to the reversible fuel cell system operating in the electrolysis mode to generate the excess fuel to be provided to the second means.

3. The system of claim 1, wherein the reversible fuel cell system is electrically connected to a third means for generating electrical energy from sun light, for providing the electrical energy to the reversible fuel cell system during daytime periods to generate fuel, and for allowing the reversible fuel cell system to generate electrical energy during night time periods, wherein night time periods are shorter than day time periods.

4. The system of claim 1, wherein the reversible fuel cell system is electrically connected to a fourth means for generating renewable electrical energy and for using excess capacity to provide electrical energy to the reversible fuel cell system operating in the electrolysis mode to generate the excess fuel.

5. The system of claim 4, wherein the fourth means is a means for generating electrical energy from sun light and for using the excess capacity during a first half of its designed lifespan.

6. The system of claim 4, wherein the fourth means is a means for generating electrical energy from wind and for using the excess capacity during periods when wind speed exceeds a predetermined wind speed required to generate a desired amount of electrical energy.

7. The system of claim 4, wherein the fourth means is a means for generating electrical energy from tidal force and for using the excess capacity during periods when the tidal force exceeds a predetermined tidal force required to generate a desired amount of electrical energy.

8. The system of claim 1, wherein the second means is a means for providing the fuel removed from the reversible fuel cell system into an airborne vehicle, a water based vehicle, a land based vehicle, a chemical reaction in a chemical manufacturing process, or a heating system of a building containing the reversible fuel cell system.

9. A method of operating an electrochemical system containing a reversible fuel cell system, comprising:

cyclically operating the reversible fuel cell system in a fuel cell mode to generate electrical energy and reactant product from fuel and oxidizer and in an electrolysis mode to generate the fuel and oxidant from the reactant product and the electrical energy;

providing excess reactant product to the reversible fuel cell system operating in the electrolysis mode from outside the reversible fuel cell system, in addition to or instead of the reactant product generated by the reversible fuel cell system in the fuel cell mode, such that fuel in excess of fuel required to operate the reversible fuel cell system in the fuel cell mode is generated in the electrolysis mode over a predetermined number of operating cycles; and removing the excess fuel generated by the reversible fuel cell system operating in the electrolysis mode from the electrochemical system.

10. The method of claim 9, wherein the reversible fuel cell system generates more fuel in the electrolysis mode than it consumes in the fuel cell mode over the predetermined number of cycles.

11. The method of claim 10, wherein the reversible fuel cell system operates at a higher current level in the electrolysis mode than in the fuel cell mode over the predetermined number of cycles.

12. The method of claim 11, wherein:
the reversible fuel cell system is electrically connected to a photovoltaic energy generation system which provides electrical energy to the reversible fuel cell system during daytime to generate fuel;
the reversible fuel cell system generates electrical energy during night time; and
the night time load on the reversible fuel cell system at least during a portion of the night time period is lower than a peak load that the reversible fuel cell system is capable of providing.

13. The method of claim 11, wherein the reversible fuel system is operated at a load lower than a peak load that the reversible fuel cell system is capable of providing at least during a portion of a time that the reversible fuel cell system operates in the fuel cell mode.

14. The method of claim 10, wherein the reversible fuel cell system operates for a longer duration in the electrolysis mode than in the fuel cell mode over the predetermined number of cycles.

15. The method of claim 14, wherein:
the reversible fuel cell system is electrically connected to a photovoltaic energy generation system which provides electrical energy to the reversible fuel cell system during daytime to generate fuel;
the reversible fuel cell system generates electrical energy during night time; and
night time periods are shorter than day time periods.

16. The method of claim 10, wherein the reversible fuel cell is electrically connected to a renewable energy source, such that an excess capacity of the renewable energy source is used to provide electrical energy to the reversible fuel cell operating in the electrolysis mode to generate the excess fuel.

17. The method of claim 16, wherein the renewable energy source comprises a photovoltaic system which contains the excess capacity during a first half of its designed lifespan.

18. The method of claim 16, wherein the renewable energy source comprises a wind turbine system which is designed to provide a minimum required amount of electrical energy at a predetermined minimum wind speed and which contains the excess capacity during periods when the wind speed exceeds the predetermined minimum wind speed.

19. The method of claim 16, wherein the renewable energy source comprises a tidal energy generation system which is designed to provide a minimum required amount of electrical energy at a predetermined minimum tidal force and which contains the excess capacity during periods when the tidal force exceeds the predetermined minimum tidal force.

20. The method of claim 9, wherein the step of providing the excess reactant product comprises providing the excess reactant product to the reversible fuel cell system operating in the electrolysis mode from outside the electrochemical system in addition to a stored reactant product generated by the reversible fuel cell system in the fuel cell mode.

21. The method of claim 9, wherein the step of providing the excess reactant product comprises providing the excess reactant product to the reversible fuel cell system operating in the electrolysis mode from outside the electrochemical system instead of the reactant product generated by the reversible fuel cell system in the fuel cell mode.

22. The method of claim 9, further comprising storing the fuel and the reactant product produced by the reversible fuel cell system.

23. The method of claim 22, wherein:
at least a portion of the stored fuel is removed from the reversible fuel cell system through a fuel conduit; and
at least a portion of the reactant product is provided to the reversible fuel cell system from outside the electrochemical system through a reactant product conduit.

24. The method of claim 22, wherein at least a portion of the stored fuel is removed from the electrochemical system by removing a fuel storage vessel from the electrochemical system.

25. The method of claim 9, wherein:
the reactant product comprises water; and
the fuel comprises hydrogen.

26. The method of claim 9, wherein:
the reactant product comprises water and carbon dioxide; and
the fuel comprises methane.

27. The method of claim 9, wherein:
the reversible fuel cell system comprises a stack of a plurality of reversible fuel cells, which generate electrical energy in the fuel cell mode and which generate fuel in the electrolysis mode; and
an equilibrium operating temperature of the fuel cell stack in the electrolysis mode is selected independently from an equilibrium operating temperature of the fuel cell stack in the fuel cell mode to optimize at least one of an amount of fuel produced in the electrolysis mode and a unit cost of the fuel produced in the electrolysis mode.

28. The method of claim 9, wherein the reversible fuel cell system comprises a stack of solid oxide regenerative fuel cells.

29. The method of claim 9, wherein the reversible fuel cell system comprises a plurality of PEM fuel cells.

30. The method of claim 9, wherein the reversible fuel cell system comprises a fuel cell which generates electrical energy and an electrolyzer cell which generates fuel.

31. The method of claim 9, further comprising providing the fuel removed from the electrochemical system into an airborne vehicle, a water based vehicle or a land based vehicle.

32. The method of claim 9, further comprising providing the fuel removed from the electrochemical system into a chemical reaction in a chemical manufacturing process.

33. The method of claim 9, further comprising providing the fuel removed from the electrochemical system into an heating system of a building containing the reversible fuel cell system.

34. An electrochemical system, comprising:
a first means for cyclically operating in a fuel cell mode to generate electrical energy and reactant product from fuel and oxidizer and in an electrolysis mode to generate the fuel and oxidant from the reactant product and the electrical energy;
a second means for providing excess reactant product to the first means operating in the electrolysis mode from outside the electrochemical system, in addition to or instead of the reactant product generated by the first means in the fuel cell mode, such that fuel in excess of fuel required to operate the first means in the fuel cell mode is generated in the electrolysis mode over a predetermined number of operating cycles; and
a third means for removing the excess fuel generated by the first means operating in the electrolysis mode from the electrochemical system.

35. The system of claim 34, wherein the first means generates more fuel in the electrolysis mode than it consumes in the fuel cell mode over the predetermined number of cycles.

36. The system of claim 35, wherein the first means is a means for operating at a higher current level in the electrolysis mode than in the fuel cell mode over the predetermined number of cycles.

37. The system of claim 36, wherein:
the first means is electrically connected to a fourth means for generating electrical energy from sun light and for providing the generated electrical energy to first means during daytime to generate fuel; and
the first means is a means for generating electrical energy during night time, such that a night time load on the first means at least during a portion of the night period is lower than a peak load that the first means is capable of providing.

38. The system of claim 36, wherein the first means is a means for operating at a load lower than a peak load that the first means is capable of providing at least during a portion of a time that the first means operates in the fuel cell mode.

39. The system of claim 35, wherein the first means is a means for operating for a longer duration in the electrolysis mode than in the fuel cell mode over the predetermined number of cycles.

40. The system of claim 39, wherein:
the first means is electrically connected to a fourth means for generating electrical energy from sun light and providing the electrical energy to the first means during daytime periods to generate fuel;
the first means is a means for generating electrical energy during night time periods, wherein night time periods are shorter than daytime periods.

41. The system of claim 34, wherein the first means is electrically connected to a fifth means for generating renewable electrical energy and for using excess capacity to provide electrical energy to the first means operating in the electrolysis mode to generate the excess fuel.

42. The system of claim 41, wherein the fifth means is a means for generating electrical energy from sun light and for using the excess capacity during a first half of its designed lifespan.

43. The system of claim 41, wherein the fifth means is a means for generating electrical energy from wind and for using the excess capacity during periods when the wind speed exceeds a predetermined minimum wind speed required to generate a desired amount of electrical energy.

44. The system of claim 41, wherein the fifth means is a means for generating electrical energy from tidal force and for using the excess capacity during periods when the tidal force exceeds a predetermined minimum tidal force required to generate a desired amount of electrical energy.

45. The system of claim 34, wherein the second means for providing excess reactant product comprises a means for providing excess reactant product to the first means operating in the electrolysis mode from outside the electrochemical system in addition to a stored reactant product generated by the first means in the fuel cell mode.

46. The system of claim 34, wherein the second means for providing excess reactant product comprises a means for providing excess reactant product to the first means operating in the electrolysis mode from outside the electrochemical system instead of the reactant product generated by the first means in the fuel cell mode.

47. The system of claim 34, further comprising a sixth means for storing the fuel produced by the first means and a seventh means for storing the reactant product produced by the first means.

48. The system of claim 34, wherein:
the reactant product comprises water; and
the fuel comprises hydrogen.

49. The system of claim 34, wherein:
the reactant product comprises water and carbon dioxide; and
the fuel comprises methane.

50. The system of claim 34, wherein the third means is a means for providing the fuel removed from the first means into an airborne vehicle, a water based vehicle, a land based vehicle, a chemical reaction in a chemical manufacturing process, or a heating system of a building containing the first means.

51. The system of claim 34, further comprising an eighth means for selecting an equilibrium operating temperature of the first means in the electrolysis mode independently from an equilibrium operating temperature of the first means in the fuel cell mode to optimize at least one of an amount of fuel produced in the electrolysis mode and a unit cost of the fuel produced in the electrolysis.

* * * * *